Patented Apr. 30, 1929.

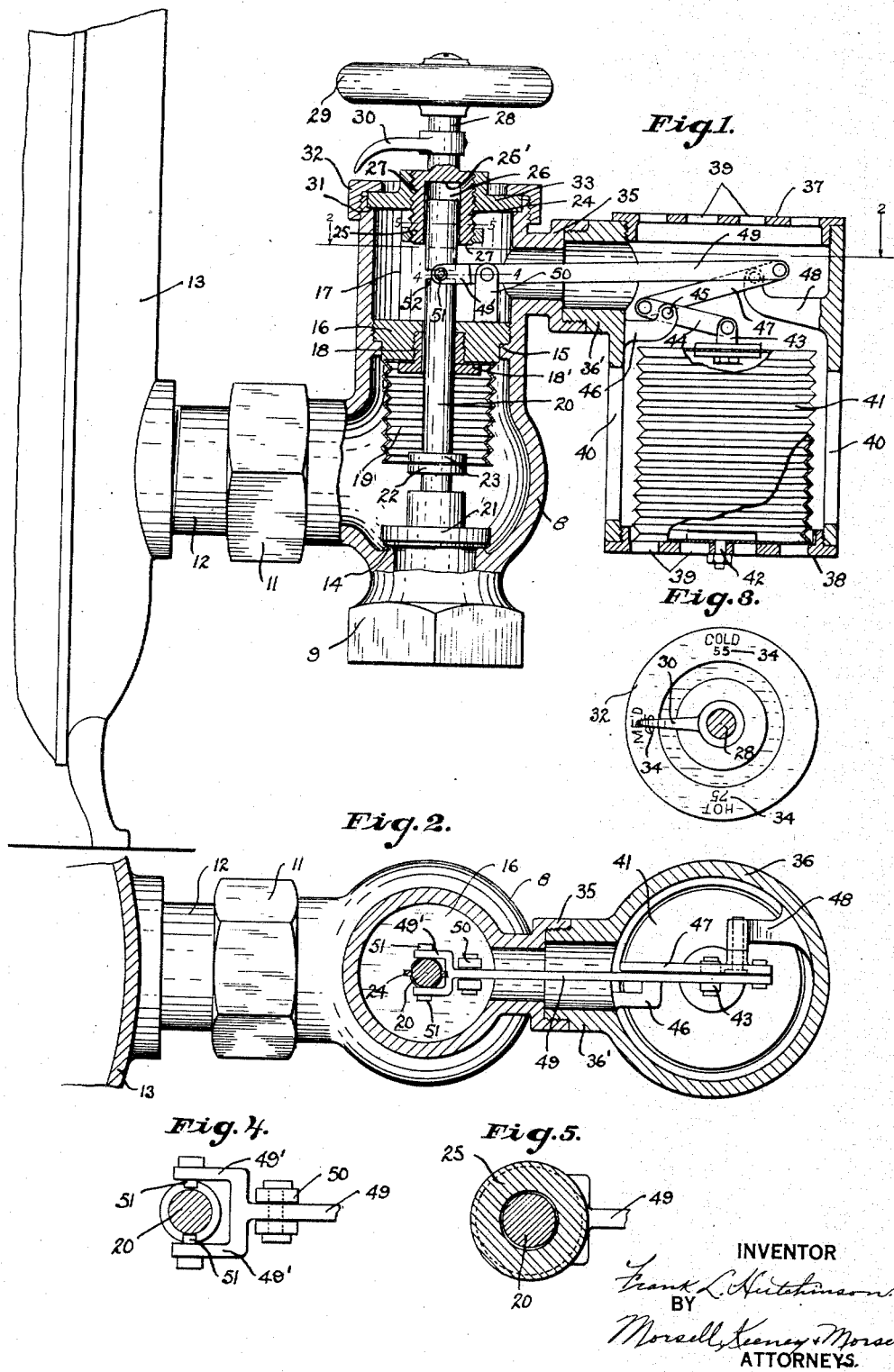

1,710,875

UNITED STATES PATENT OFFICE.

FRANK L. HUTCHINSON, OF WAUWATOSA, WISCONSIN.

COMBINED SUPPLY AND AUTOMATIC TEMPERATURE CONTROL VALVE FOR FLUID RADIATORS.

Application filed June 6, 1927. Serial No. 196,919.

This invention relates to improvements in combined supply and automatic temperature control valves for fluid radiators.

It is the primary object of the present invention to provide an automatic, temperature controlled valve for independent heating radiators.

A further object of the invention is to provide a thermally controlled radiator valve which may also be hand operated and regulated.

A further object of the invention is to provide a radiator valve which has an automatic thermal control and which also has an independent hand operated control and so arranged that the thermal unit may be detached if desired and the valve operated manually independently thereof.

A further object of the invention is to provide a combination valve of the class described with which any form of heating radiator may be equipped, and which is small and compact and neat in appearance.

A further object of the invention is to provide a combination valve of the class described which is of very simple construction, is inexpensive to manufacture, is strong and durable, and is well adapted for the purpose described.

With the above and other objects in view the invention consists of the improved supply and temperature control valve for radiators, and its parts and combinations as set forth in the claims, and all equivalents thereof.

In the accompanying drawing in which the same reference characters indicate the same parts in all of the views:

Fig. 1 is a vertical sectional view of the improved valve shown connected with a radiator;

Fig. 2 is a cross sectional view taken on line 2—2 of Fig. 1;

Fig. 3 is a plan view of the dial and indicator with the valve rod shown in section;

Fig. 4 is an enlarged detail sectional view taken on line 4—4 of Fig. 1; and

Fig. 5 is an enlarged detail sectional view taken on line 5—5 of Fig. 1.

Referring now more particularly to the drawing it will appear that the numeral 8 indicates the main casing of the valve having a depending coupling portion 9 adapted to be secured to a fluid supply pipe (not shown). Said coupling portion 9 opens into a chamber 10 from which extends laterally another coupling portion 11 adapted to be secured to a pipe 12 communicating with a heating radiator 13. The casing 8, adjacent the opening from the coupling portion 9 in to the chamber 10, is formed with an annular rib 14 to form a valve seat.

Within the casing 8, between its upper and lower ends, an internal, annular rib 15 is formed on which is seated a bushing 16 which is in threaded engagement with the adjacent casing walls and which defines an upper chamber 17 separated from the lower chamber 10. A small bushing 18 is threaded medially into the lower portion of the bushing 16 and confined between the flanged surface 18' of the small bushing 18 and the bottom surface of the bushing 16 is the upper end portion of a closed bellows member 19.

A valve rod 20 extends vertically through the casing 8 and carries a valve 21 at its lower end portion which controls the lower opening in the casing from the supply pipe and seats on the rib 14. The intermediate portion of the valve rod extends through the bellows member 19 and also through registering openings in the bushings 16 and 18, said openings being of slightly greater diameter than the diameter of the valve rod so as to eliminate friction. The valve rod is secured to the lower end portion of the bellows member by means of a pair of adjacent discs 22 and 23 secured on the rod, one interiorly of and the other exteriorly of the bellows members clamping the same therebetween whereby the bellows member is contracted and expanded with movements of the valve rod. It will be evident that the arrangement of the valve rod and the bushings 16 and 18 and the bellows member is such that friction in the movement of the valve rod is minimized, and also the chamber 10 is sealed from the upper chamber 17 so as to prevent leakage.

The upper end portion of the valve rod 20 terminates interiorly of the upper end portion of the casing 8. Surrounding the upper end portion of the valve rod is an externally threaded turning member 25, bored as at 26, to fit loosely over the valve rod. Integral with the turning member 25 and extending upwardly therefrom is a stem portion 28 on the upper end of which is secured a hand wheel 29, and to which an indicator arm 30 is also secured.

Clamped in an annular seat 31 in the upper end portion of the casing 8 by means of a cover 32 screwed onto the casing end portion, is a disc member 33 having an enlarged midportion which is bored and internally threaded and through which portion the turning member 25 is threaded. The upper surface of the cover 32 forms a dial with temperature indications 34 marked thereon for cooperation with the indicator 30. It is evident that the valve rod 20 is free to move vertically, without turning, with respect to the member 25, and upward movement is limited by contact with the top surface 25' of the member 25, and the distance of said top surface from the top of the valve rod may be adjusted by turning the hand wheel 29, which through the shank 28 will cause the member 25 to be turned inwardly or outwardly. Also, when the member 25 is turned downwardly sufficiently far, it will engage and push downwardly the valve rod to manually close the valve 21. If the member 25 be raised, the natural expansibility of the member 19 will lift the rod to open the valve, and the amount which it may be opened is regulated, by limiting the possible upward movement of the valve rod, as mentioned.

The upper portion of the casing 8 is provided with a side tubular extension 35 communicating with the chamber 17 and in threaded engagement with the outer end portion of the extension 35 is a side tubular extension portion 36' of an auxiliary casing 36. The casing 36 is of cylindrical form and is closed at its upper and lower ends by covers 37 and 38 threaded thereinto, said covers being provided with a plurality of air vents or apertures 39. The side of the casing 36 is also formed with large openings for the admission of air.

Contained within the casing 36 is a thermostatic bellows 41 which is readily contractile and expansile and is filled with a volatile fluid easily influenced by temperature changes. The bottom portion of the thermostatic bellows is anchored to the lower cover 38 of the casing by a bolt or stud 42. An arm 43 is secured to the upper end portion of the thermostatic bellows and pivotally connected to said arm is one end portion of a lever 44 which is fulcrumed intermediate its ends, as at 45, to an arm 46 attached to the casing 36. The other end portion of the lever 44 is pivotally connected with one end portion of a second lever 47 which is also fulcrumed intermediate its ends, to an arm 48 extending from the casing 36 opposite the arm 46. The other end portion of the lever 47 is pivotally connected to one end portion of a long lever 49 which is extended through the extension portions 35 and 36' of the casings 8 and 36 and into the chamber 17, where it is fulcrumed, near its extended end portion, to a bifurcated lug 50 projecting upwardly from the bushing 16. The extended end portion of the lever 49 is of bifurcated formation with arms 49', as shown in Fig. 4, and projecting inwardly from said arms are a pair of opposed studs 51 which engage an annular recess 52 in the valve rod 20. By this arrangement, when the bifurcated end portion of the bar 49 is raised or lowered through the compound leverage described, the valve rod will be also raised or lowered.

In use, changes in room temperature will influence the fluid filled thermostatic bellows to cause it to contract or expand, and such movements will be translated to the valve rod through the compound leverage to automatically open or close the valve. Also, when desired the valve may be manually operated or adjusted for a different temperature than that ordinarily resulting from the operation of the sylphon. If, for any reason it is desired to remove the automatic control of the valve, the auxiliary casing and levers are easily detached and the opening of the main casing plugged.

From the foregoing description it will be seen that the improved combination valve for heating radiators is of very simple and novel construction, and is well adapted for the purposes set forth.

What is claimed as the invention is:

1. A valve for fluid radiators, comprising a two-part casing, there being a fluid opening in one casing portion, a valve member controlling said opening, a valve rod therefor and extending through said casing portion, means attached to the valve rod for manually operating the valve member, a thermostatic bellows within the other casing portion, and a compound leverage between the thermostatic bellows and the valve rod.

2. A valve for fluid radiators, comprising a main casing having a fluid opening, a valve member controlling said opening, means extending from the main casing for manually operating the valve member, an auxiliary casing readily detachably connected with the main casing, a thermostatic bellows within said auxiliary casing, and a compound leverage between the thermostatic bellows and the valve member.

3. A valve for fluid radiators, comprising a main casing having a fluid opening, a valve member controlling said opening, a valve rod therefor and extending through the main casing, a partition within the main casing, the valve rod being vertically movably extended therethrough, bellows means for sealing the valve rod opening in the partition, a member engaging the upper end portion of the valve rod for limiting its vertical movements, said member also permitting sliding movements between it and the valve rod, a hand wheel attached to said member, an auxiliary casing detachably connected with the main casing, a thermostatic bellows therewithin, and a compound leverage between the thermostatic bellows and the valve rod.

4. A valve for fluid radiators, comprising a casing having a fluid opening, a valve rod therefor and extending through the casing, and means engaging said valve rod for manually operating it, said casing having an extension for the quick attachment of an auxiliary casing and automatic thermally controlled valve operating mechanism.

In testimony whereof, I affix my signature.

FRANK L. HUTCHINSON.